United States Patent
Ino

(10) Patent No.: US 8,472,038 B2
(45) Date of Patent: Jun. 25, 2013

(54) IMAGE SCANNING APPARATUS AND IMAGE PROCESSING APPARATUS INCLUDING PLATEN WITH DOCUMENT RETAINING PARTS

(75) Inventor: Shiro Ino, Tokyo (JP)

(73) Assignee: Oki Data Corporation, Tokyo (JP)

( * ) Notice: Subject to any disclaimer, the term of this patent is extended or adjusted under 35 U.S.C. 154(b) by 771 days.

(21) Appl. No.: 12/687,929

(22) Filed: Jan. 15, 2010

(65) Prior Publication Data

US 2010/0182628 A1   Jul. 22, 2010

(30) Foreign Application Priority Data

Jan. 21, 2009   (JP) .................................. 2009-010586

(51) Int. Cl.
*G06K 15/00* (2006.01)
*H04N 1/00* (2006.01)

(52) U.S. Cl.
USPC ........................................ 358/1.13; 358/474

(58) Field of Classification Search
USPC ................ 358/1.1, 1.13, 1.14, 474, 488, 492, 358/498; 100/58, 210; 101/57, 69, 78; 347/101, 347/197, 220; 399/95, 361, 379, 406; 400/48, 400/451, 600.1, 519.3, 600.4

See application file for complete search history.

(56) References Cited

U.S. PATENT DOCUMENTS

| 2,687,795 | A  | * | 8/1954 | Wise ................................ 400/31 |
| 6,682,190 | B2 | * | 1/2004 | Belbey et al. ................. 347/104 |
| 6,808,259 | B2 | * | 10/2004 | Rasmussen et al. .......... 347/104 |
| 7,677,719 | B2 | * | 3/2010 | Nakashima et al. .......... 347/104 |

FOREIGN PATENT DOCUMENTS

JP   2006-087008 A   3/2006

* cited by examiner

*Primary Examiner* — Gabriel Garcia

(74) *Attorney, Agent, or Firm* — Marvin A. Mostenbocker; Mots Law, PLLC

(57) ABSTRACT

An image scanning apparatus includes: a platen; scanning unit configured to scan an image from the document placed on the platen; and document retaining parts provided at positions corresponding to at least two sides of the platen and configured to prevent the document from curling away from the platen.

19 Claims, 13 Drawing Sheets

IMAGE SCANNING APPARATUS AND IMAGE PROCESSING APPARATUS INCLUDING PLATEN WITH DOCUMENT RETAINING PARTS

CROSS REFERENCE TO RELATED APPLICATIONS

This application claims priority based on 35 USC 119 from prior Japanese Patent Application No. P2009-010586 filed on Jan. 21, 2009, entitled "PLATEN MECHANISM AND APPARATUS USING THE SAME", the entire contents of which are incorporated herein by reference.

BACKGROUND OF THE INVENTION

1. Field of the Invention

The invention relates to an image scanning apparatus that scans images on a document and to an apparatus using the image scanning apparatus.

2. Description of Related Art

A conventional image scanning apparatus has a document platen on which a document can be placed, and a cover configured to cover the document on the platen (for example, JP2006-87008). With such an image scanning apparatus, an operator places the document on the platen, aligns a side of the document to a side of the platen, and then closes the cover over the document to hold the document at a predetermined position.

However, some documents are distorted, e.g., curled, rolled, or bent. Such a document, when placed on the platen, does not lie flat in complete contact with the platen. Therefore, it is difficult to place the document at the predetermined position on the platen.

To overcome the problem, there is an image scanning apparatus that has one side of the platen having a portion (hereinafter "a document retaining part") configured to capture one side of the document to prevent it from curling away from the platen. In the image scanning apparatus, the document retaining part prevents one side of the document from curling away from the platen by retaining the one side of the document. When a cover is closed over the document that is retained in this manner, the distorted document is pressed into complete contact with the platen surface. Accordingly, in the image scanning apparatus, the distorted document can be set at a predetermined position on the platen, and the distortion of the document can be corrected.

However, the distorted document is occasionally misaligned or bent on the platen of the image scanning apparatus, and such misalignment or bend may cause out of focus scanning of the document.

Namely, since the document retaining part is provided at one side only of the platen, the distorted document is retained at the one side where the document retaining part is provided, but not retained at the side where no document retaining part is provided. Therefore, the distorted document may curl at the side where no document retaining part is provided.

In the image scanning apparatus, when the cover is closed over a document that is partially curled away from the platen, the pressure of the cover may push the document away from the predetermined position on the platen, or bend the document. Hence, the document may be misaligned from the predetermined position or bent on the platen. Such misalignment or bend causes out of focus scanning of the document.

Such problems may occur in an apparatus having a platen such as a copy machine, a facsimile machine, a MFP (multi-functional printer or Peripheral), or other image processing apparatus.

SUMMARY OF THE INVENTION

An aspect of the invention is an image scanning apparatus including: a platen; a scanning unit configured to scan an image of the document placed on the platen; and document retaining parts provided at positions corresponding to at least two sides of the platen and configured to prevent the document from curling away from the platen.

According to an aspect of the invention, retaining positions can prevent a distorted document from misaligning and bending on the platen of the image scanning apparatus.

BRIEF DESCRIPTION OF THE DRAWINGS

FIGS. 10A and 10B are explanatory views showing the operation of a document retaining member having the document retaining part according to the second embodiment, wherein FIG. 10A shows a state before sliding the document retaining member and FIG. 10B shows a state after sliding the same.

FIGS. 15A and 15B are explanatory views showing the operation of the document retaining member having the document retaining part according to the third embodiment, wherein FIG. 15A shows a state before sliding the document retaining member and FIG. 15B shows a state after sliding the same.

DETAILED DESCRIPTION OF EMBODIMENTS

Figure 1:
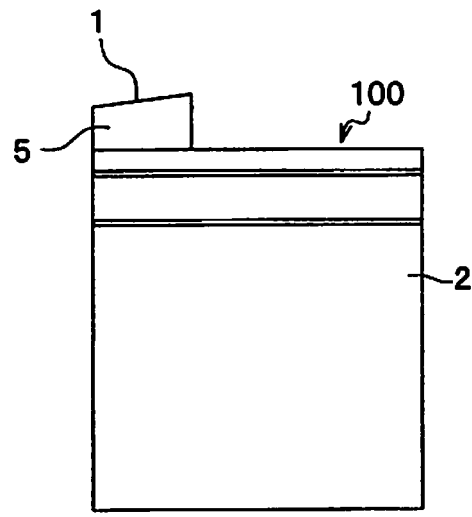
FIG. 1 is a side view of a configuration of an image processing apparatus having an image scanning apparatus according to a first embodiment.

Embodiments of the invention are explained with reference to the drawings. All of the drawings referenced herein are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another. In the respective drawings referenced herein, the same constituents are designated by the same reference numerals and duplicate explanation concerning the same constituents is omitted.

First Embodiment

Configuration of Image Scanning Apparatus

Figure 2:
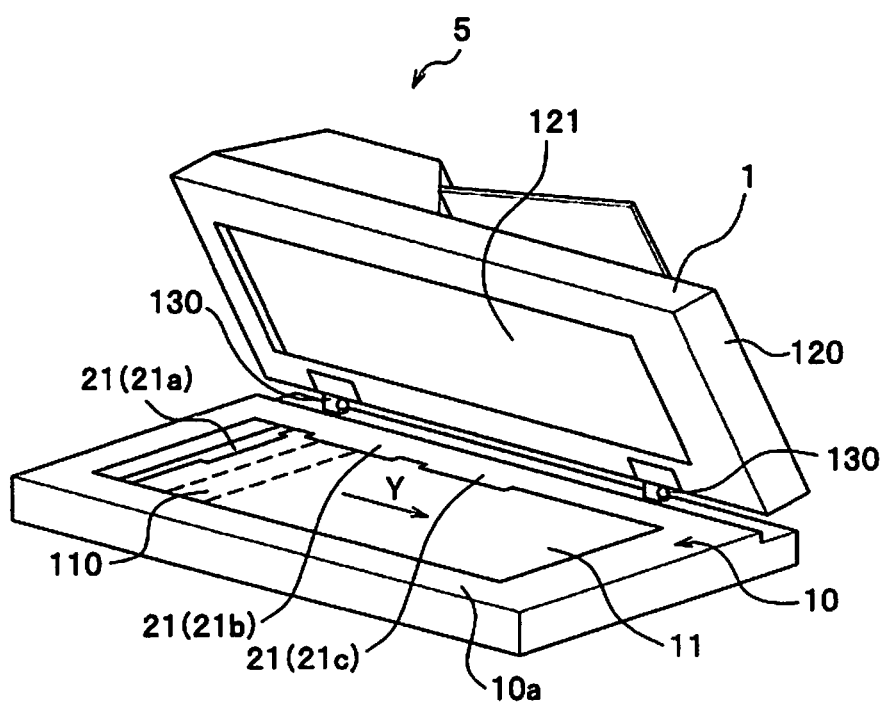
FIG. 2 is a perspective view of a configuration of the image scanning apparatus according to the first embodiment.

A configuration of an image scanning apparatus according to a first embodiment of the invention is explained as follows by referring to FIGS. 1 and 2. FIGS. 1 and 2 show the configuration of the image scanning apparatus according to the first embodiment. The image scanning apparatus 1 of the first embodiment is described as a scanner having platen mechanism 5.

FIG. 1 shows a configuration of image processing apparatus 100 including image scanning apparatus 1. In an example shown in FIG. 1, image processing apparatus 100 serves as a MFP which includes image scanning apparatus 1 and image forming apparatus 2. The "MFP" refers to "Multi Function Printer (or Product)", which is a printing apparatus that has facsimile function, scanning function, copying function, or the like. Image scanning apparatus 1 optically scans images on document 3 (see FIG. 6), and then image forming apparatus 2 forms (prints) the scanned images on a medium such as a paper sheet.

FIG. 2 is a perspective view of a configuration of image scanning apparatus 1. As shown in FIG. 2, image scanning apparatus 1 includes CCD unit 110 serving as an image scanning mechanism and platen mechanism 5 having document platen 10 and cover 120.

CCD unit 110 is configured to optically scan images on document 3. CCD unit 110 includes a CCD image sensor having photo-sensitive elements arranged in a line or lines, which is configured to convert light to electricity.

The CCD image sensor is disposed under and faces a glass plate whose upper surface is glass surface 11 serving as a document placing surface or a document placing area. That is, the CCD image sensor faces glass surface 11 such that the CCD image sensor faces document 3 that is placed on glass surface 11 through glass surface 11. CCD unit 110 is driven by a drive unit and traverses in the Y direction shown in FIG. 2 under the glass plate and scans document 3 on glass surface 11 by means of the CCD image sensor. Image information obtained through the scanning operation is temporarily saved at a memory unit (not shown), then, used, by image forming apparatus 2 in its printing process.

Document platen 10 is a table that provides a surface on which document 3 can be placed. Document platen 10 includes glass surface 11 and frame 10a. Glass surface 11 is provided in a middle area of document platen 10 and frame 10a is provided around glass surface 11. In other words, glass surface 11 as the document placing surface or the document placing area is defined by frame 10a. Document 3 (see FIGS. 5 and 6) is placed on glass surface 11 in such a manner that an image on document 3 that is to be scanned by CCD unit 110 faces glass surface 11. Note that there is a space under glass surface 11 where CCD unit 110 moves.

Cover 120 is configured to press document 3 that is placed on glass surface 11 against glass surface 11. Cover 120 is attached to document platen 10 with a hinge member and is rotatable relative to document platen 10 about rotation axis 130 of the hinge member. That is, cover 120 is rotatable between a first position (i.e. open position) and a second position (i.e. close position). At the first position of cover 120, document 3 can be place on glass surface 11. At the second of cover 120, document 3 is pressed against glass surface 11 by cover 120.

Cover 120 has document presser 121 that faces document platen 10 at the second position. Document presser 121 is configured to directly press document 3 against glass surface 11 on document platen 10. Document presser 121 faces glass surface 11 when cover 120 is closed. Document presser 121 has substantially the same shape as glass surface 11 but has a slightly larger size than glass surface 11. Document presser 121 has an outer white surface, and an inner elastic member such as a sponge. When cover 120 is closed, the white surface covers over document 3 on glass surface 11 and the elastic property of the elastic member presses document 3 against glass surface 11.

Figure 3:
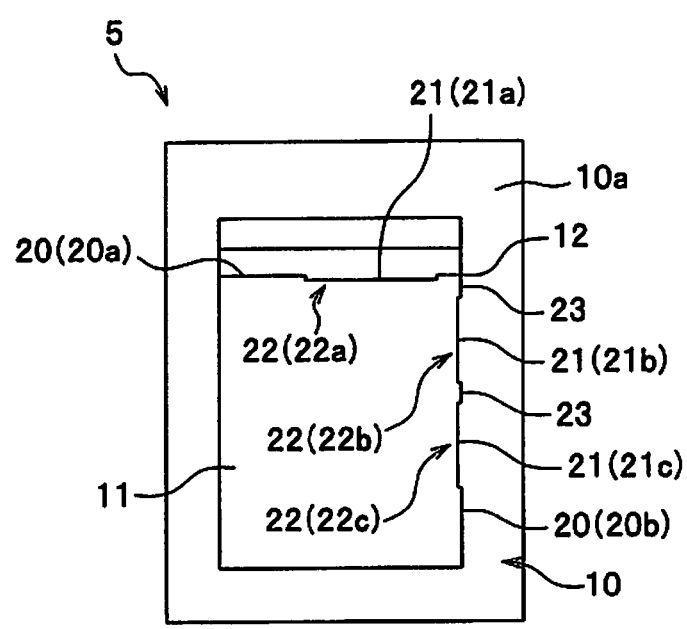
FIG. 3 is a plan view of a platen of the image scanning apparatus showing a configuration of a document retaining part.

In this configuration, projections 21 are provided at two of the sides of the platen (namely, at two of sides 20 of frame 10a) in such a manner that projections 21 extend over glass surface 11 as shown in FIG. 3. Projections 21 are portions that can retain document 3 and prevent document 3 from curling away from document platen 10. Hereinafter, projections 21 are referred to as "document retaining part 21." Document retaining part 21 is a projection in the embodiment; however, document retaining part 21 can be any form other than a projection if document retaining part 21 is configured to retain document 3 on document platen 10 and prevents document 3 from curling away from document platen 10.

Configuration of Document Retaining Part According to First Embodiment

Figure 4:
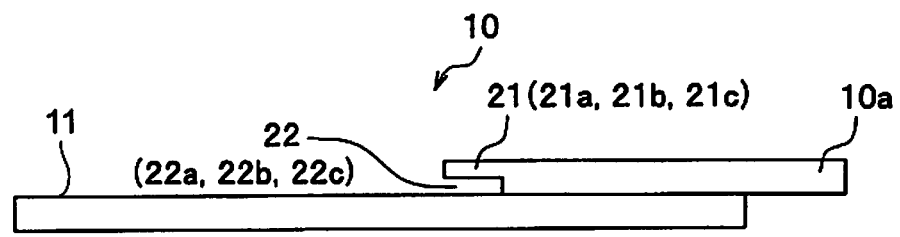
FIG. 4 is a side view of the platen.

A configuration of document retaining part 21 according to the first embodiment is described as follows by referring to FIGS. 3 and 4. FIGS. 3 and 4 show the configuration of document retaining part 21 according to the first embodiment. FIG. 3 is a plan view showing document retaining part 21 and a vicinity of the same. FIG. 4 is a side view of document retaining part 21.

As shown in FIG. 3, glass surface 11 of document platen 10 has two neighboring sides 20 (e.g. short side 20a and long side 20b in FIG. 3) that meet at the right angle at reference point 12. In other words, the opening of frame 10a of document platen 10 has two neighboring sides 20 (e.g. short side 20a and long side 20b in FIG. 3) that meet at the right angle at reference point 12. Hereinafter, in order to distinguish between short side 20a and long side 20b, they are referred to as "first side 20a" and "second side 20b," respectively. Reference point 12 is a point that is referenced when placing document 3 on document platen 10. Document 3 is placed on glass surface 11 of document platen 10 such that a corner between two adjacent sides of document 3 is fit to reference point 12.

In FIG. 3, document platen 10 has three document retaining parts 21 that are referred to as first document retaining part 21a, second document retaining part 21b, and third document retaining part 21c. In FIG. 3, first, second, and third document retaining parts 21a, 21b, and 21c are formed at frame 10a. First document retaining part 21a is disposed at first side 20a of document platen 10. Second and third document retaining parts 21b and 21c are disposed at second side 20b of document platen 10.

Gaps 22 are defined between each document retaining part 21 and glass surface 11 (see FIGS. 4 and 6). Document 3 can be inserted into each gap 22. When a side of document 3 is inserted in gap 22, document retaining part 21 prevents document 3 from curling away from glass surface 11. Hereinafter, in order to distinguish gaps 22 corresponding to each of document retaining part 21, a gap (22) that corresponds to first retaining part 21a is referred to as "first gap 22a," a gap (22) that corresponds to second retaining part 21b is referred to as "second gap 22b" and a gap (22) that corresponds to third retaining part 21c is referred to as "third gap 22c", respectively.

Through section 23 at which no document retaining part is provided on side 20, the operator can visually check whether the side of document 3 is touching to side 20. Hereinafter, section 23 of side 20 that does not have document retaining part 21 is referred to as "visual inspection section 23."

When an operator of image scanning apparatus 1 places document 3 on glass surface 11 of document platen 10, the operator inserts a side of document 3 to first gap 22a of first side 20a, then slides document 3 towards second side 20b to insert another side of document 3 to second gap 22b and third gap 22c of second side 20b. While placing document 3 on document platen 10, the operator looks at visual inspection section 23 to check whether sides of document 3 are in contact with sides 20 of document platen 10. In this manner, document 3 is placed on glass surface 11 of document platen 10.

At this time, document 3 is retained by document retaining parts 21 provided at two sides 20 (at first side 20a and second side 20b that meet at reference point 12 in this embodiment) of document platen 10. Then, cover 12 is placed over document 3, correcting the distortion of document 3.

Operation of the Document Retaining Part According to First Embodiment

Figure 5:
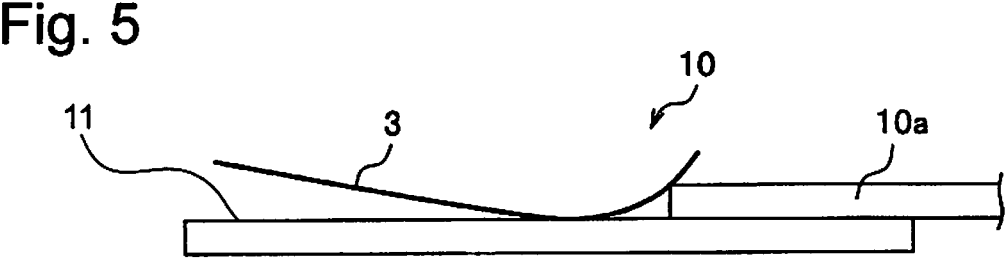
FIG. 5 is a view explaining operation of the document retaining part.
Figure 6A:
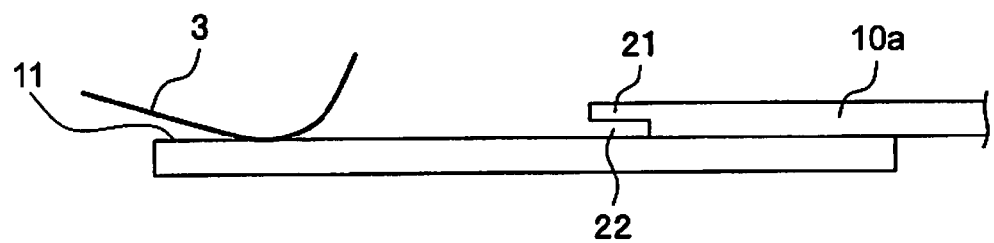
FIGS. 6A and 6B are views explaining operation of the document retaining part.
Figure 6B:
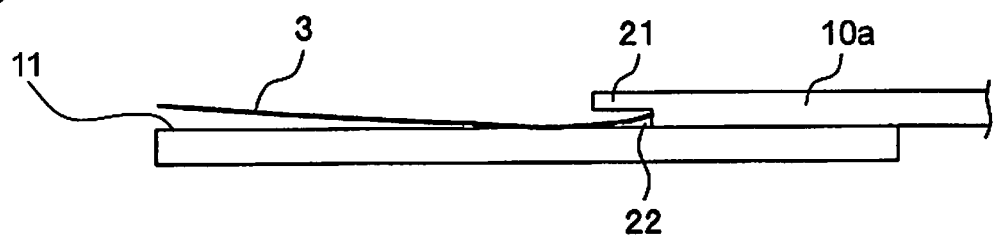

The operation of document retaining part 21 according to the first embodiment is explained as follows by referring to FIGS. 5, 6A, and 6B. FIGS. 6A and 6B show functions of document retaining part 21 according to the first embodiment. FIG. 5 shows a state in which a side of document 3 is placed at a side that has no document retaining part, in a case (comparative example) where document retaining part 21 is provided at only one of first side 20a and second side 20b of document platen 10. FIGS. 6A and 6B show states in which a side of document 3 is placed at a side that has document retaining part 21, in a case (the first embodiment) where document retaining part 21 is provided both at first side 20a and second side 20b of document platen 10. Hereinafter, the function of document retaining part 21 is explained by comparing FIG. 5 with FIGS. 6A and 6B.

As shown in FIG. 5, in the case where document retaining part 21 is provided only at either first side 20a or second side 20b of document platen 10, distorted document 3 tends to curl away from document platen 10 at the other side where no document retaining part is provided. Note that in the case where document retaining part 21 is provided only at either first side 20a or second side 20b of document platen 10 as shown in FIG. 5, document 3 tends to curl away from document platen 10 at its end in the Y direction or at its end in a direction orthogonal to the Y direction shown in FIG. 2. For example, in the case where document retaining part 21 is only provided at first side 20a, document 3 tends to be distorted at its end in the Y direction shown in FIG. 2. On the other hand, in a case where document retaining part 21 is only provided at second side 20b, document 3 tends to be distorted at its end in a direction orthogonal to the Y direction shown in FIG. 2. In the example shown in FIG. 5, if cover 120 is closed over such document 3 with a partial distortion, document 3 may be misaligned from a predetermined position or bent due to pressure of cover 120.

In contrast, as shown in FIGS. 6A and 6B, when document retaining part 21 is provided both at first side 20a and second side 20b of document platen 10 (the first embodiment), distorted document 3 is unlikely to be curled away from the document platen 10 at neither first side 20a nor second side 20b because document 3 is retained at both of first side 20a and second side 20b. Note that FIG. 6A shows a state before placing document 3 onto glass surface 11, and FIG. 6B shows a state after placing document 3 onto glass surface 11.

As described above, according to the first embodiment, document retaining part 21 is provided at two sides 20 of document platen 10 (i.e., first side 20a and second side 20b that meet each other at reference point 12 in the above example). This configuration increases the number of contact positions between document retaining parts 21 and document 3 compared to that in the conventional art. Also in the first embodiment, because document retaining parts 21 provided at more than two sides (20a, 20b) retain document 3, partial lifting of document 3 (especially both the distortion in the Y direction and the direction orthogonal to the Y direction of document 3 shown in FIG. 2) can be prevented.

Further, according to the first embodiment, when cover 120 is closed over document 3 while the partial lift of document 3 is prevented, the distortion of document 3 can be corrected.

Accordingly, misalignment and bend of document 3 are prevented. Therefore, image scanning apparatus 1 according to the first embodiment can scan document 3 without misalignment or bend thereof, and thereby preventing out of focus scanning of the document.

Second Embodiment

In the first embodiment, document retaining part 21 is formed on document platen 10 (see FIG. 3). In contrast, document retaining part 21 in a second embodiment is not formed on document platen 10 but is formed on document retaining member 40 which is a slide member separate from document platen 30 (see FIG. 7).

Configuration of Document Retaining Part According to Second Embodiment

A configuration of document retaining part 41 according to the second embodiment is explained as follows by referring to FIGS. 7 to 11. FIGS. 7 to 11 show a configuration of document retaining part 41 according to the second embodiment.

Figure 7:
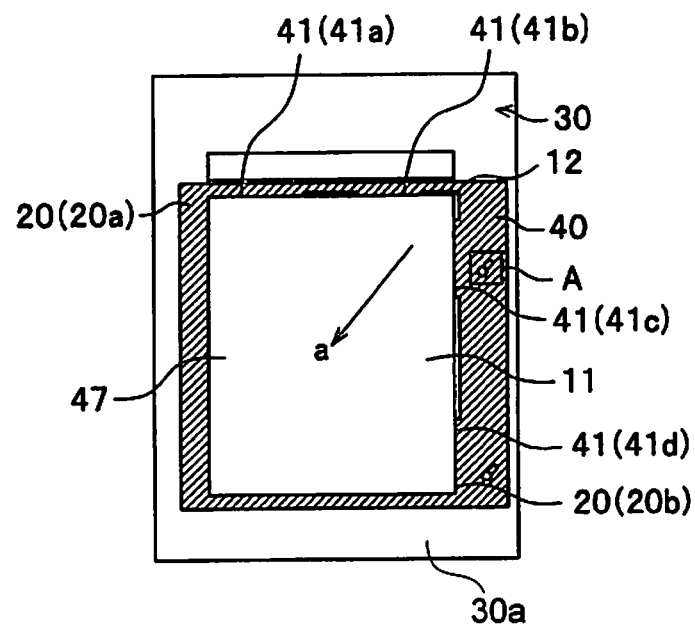
FIG. 7 is a plan view of a platen of an image reading apparatus showing a configuration of a document retaining part according to a second embodiment.

FIG. 7 is a plan view showing document retaining part 41 and a vicinity of the same. As shown in FIG. 7, document retaining member 40 is disposed on document platen 30. Document retaining member 40 has document retaining part 41. Document retaining member 40 is formed such that the size of document retaining member 40 is larger than glass surface 11 of document platen 30 but smaller than document platen 30. Document retaining member 40 has a rectangular opening 47 that is substantially the same shape and size as glass surface 11 of document platen 30, such that glass surface 11 is exposed through opening 47 of document retaining member 40.

Document retaining member 40 has four document retaining parts 41 that are referred to as first, second, third, and fourth document retaining parts 41a, 41b, 41c, and 41d, respectively, provided at two sides of opening 47, namely, at first side 20a and at second side 20b that meet at reference point 12. As shown in FIG. 7, first document retaining part 41a and second document retaining part 41b are provided at first side 20a of opening 47 of document retaining member 40, and third document retaining part 41c and forth document retaining part 41d are provided at second side 20b of opening 47 of document platen 40.

Figure 8:
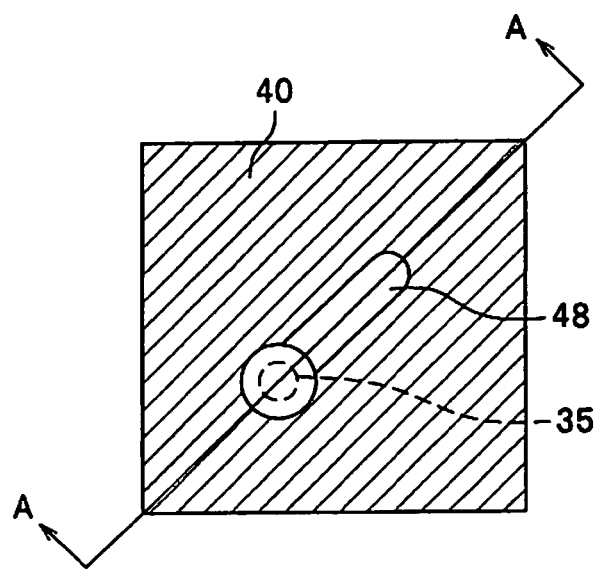
FIG. 8 is an enlarged view of part A in FIG. 7.
Figure 9:
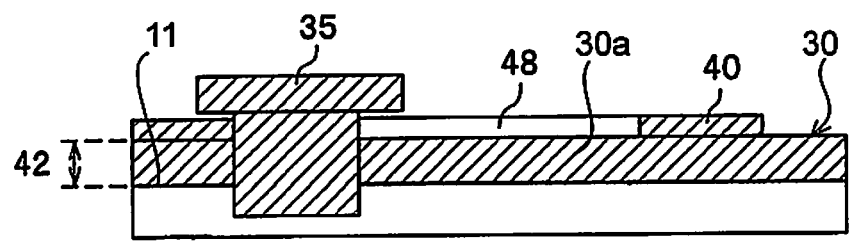
FIG. 9 is a sectional view along the A-A line in FIG. 8 showing a configuration of the document retaining part according to the second embodiment.

Document retaining member 40 is slidably attached to document platen 30 so that document retaining member 40 does not obstruct placing a thick document 3 such as a book or a magazine onto glass face 11 (see FIGS. 8 and 9). FIGS. 8 and 9 show attachment configurations of document retaining member 40 to document platen 30. FIG. 8 is an enlarged view of a part shown in FIG. 7. FIG. 9 is a sectional view along line A-A shown in FIG. 8.

As shown in FIGS. 8 and 9, document retaining member 40 has elongated hole 48 that extends in a sliding direction (i.e., the "a" direction shown in FIG. 7) of document retaining member 40. On the other hand, projection 35 such as a pin, rivet, screw, or the like is fixed and projects from frame 30a of document platen 30. Projection 35 is inserted into and engaged with elongated hole 48, so that document retaining member 40 is slidable along elongated hole 48. Further, there is a step (a difference in level) between the bottom face of document retaining member 40 and glass surface 11, which corresponds to the thickness of frame 30a. When document retaining member 40 is slid in the "a" direction shown in FIG. 10 and document retaining part 41 is positioned above glass surface 11, this difference in level (the step) forms gap 42 where a side of document 3 can be inserted.

Figure 10A:
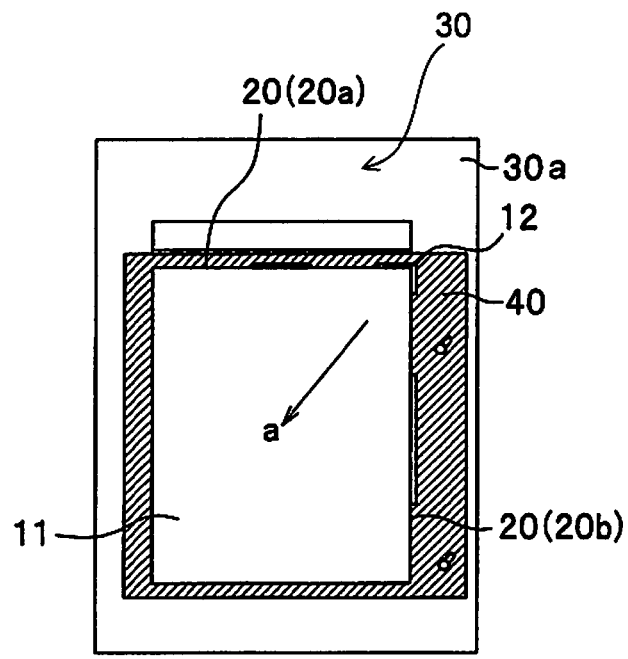
Figure 10B:
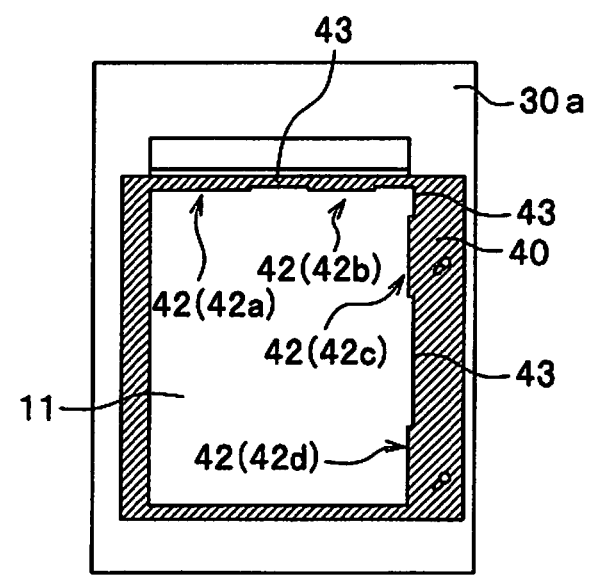

FIG. 10 shows an operation of document retaining member 40. FIG. 10A shows a state before document retaining member 40 is slid and FIG. 10B shows a state after document retaining member 40 is slid. The slidable distance of document retaining member 40 is restricted by the shape of elongate hole 48.

Document retaining member 40 is slidable in the "a" direction on document platen 30 (that is, in a diagonal direction relative to side 20) as shown in FIG. 10A. As shown in FIG. 10B, upon sliding, document retaining member 40 has gap 42 formed between each of corresponding document retaining part 41 and glass surface 11, to which a side of document 3 is inserted. Hereinafter, gaps 42 that correspond to each document retaining member 40 is distinguished by referring to them as "first gap 42a" for gap 42 that corresponds to first document retaining part 41a (see FIG. 7), "second gap 42b" for gap 42 that corresponds to second document retaining part 41b, "third gap 42c" for gap 42 that corresponds to third document retaining part 41c, and "forth gap 42d" for gap 42 that corresponds to forth document retaining part 41d. Further, a section 23 of side 20 that does not have document retaining part 21 is referred to as "visual inspection section 23."

When an operator of image scanning apparatus 1 places document 3 on glass surface 11 of document platen 30, the operator inserts a side of document 3 into first gap 42a and second gap 42b at first side 20a, then slides document 3 towards second side 20b to insert another side of document 3 to third gap 92c and forth gap 42d at second side 20b. While placing document 3 on document platen 30, the operator looks at visual inspection section 43 to check whether the two sides of document 3 are touching the two sides 20 of document platen 30. Document 3 can be placed on glass surface 11 of document platen 30 in this manner.

The operator can slide document retaining member 40 so that a position of document retaining member 40 is moved appropriately. Preferably, the position is moved depending on the kind of document 3. For example, when document 3 is a thick medium such as a book or a magazine, document retaining member 40 may be slid to an appropriate position such that document retaining member 40 does not get in the way of placing document 3 on document platen 30 as shown in FIG. 10A. More over, when document 3 is a thin medium, document retaining member 40 is slid to an appropriate position such that document retaining member 40 can retain document 3 as shown in FIG. 10B.

In the second embodiment, as document retaining member 40 is slid from a position shown in FIG. 10A to a position shown in FIG. 10B, document retaining member 40 forms first, second, third, and forth gaps 42a, 42b, 42c, and 42d in a single slide operation. Conversely, as document retaining member 40 is slid from the position shown in FIG. 10B to the position shown in FIG. 10A, document retaining member 40 retracts first, second, third, and forth gaps 42a, 42b, 42c, and 42d in a single slide operation.

Figure 11:
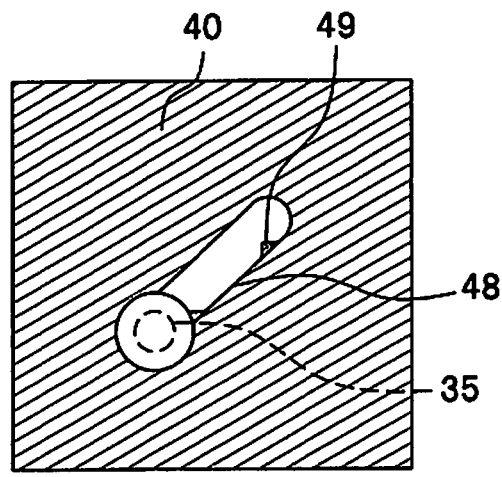
FIG. 11 is an enlarged view in the vicinity of an elongated hole of the document retaining member.

Document retaining member 40 may be modified to a configuration shown in FIG. 11. FIG. 11 shows an example of a modification of document retaining member 40 according to the second embodiment. In the example shown in FIG. 11, elongated hole 48 of document retaining member 40 has stopper 49 projected from the side face of elongated hole 48. Projection 35 is more easily stopped by this stopper 49. In this way, movements of document retaining member 40 can be controlled so that document retaining member 40 does not slide too easily.

As described above, according to the second embodiment, the same result is achieved as in platen mechanism 5, document scanning apparatus 1, and image processing apparatus 100 described in the first embodiment. Further, according to the second embodiment, the position of document retaining member 40 can be changed depending on the thickness of document 3 by sliding document retaining member 40. In this way, first, second, third, and forth gaps 42a, 42b, 42c, and 42d are readily formed or retracted. Therefore, scanning a thick document 3 such as a book or magazine as well as a thin document 3 is enabled.

Third Embodiment

In the second embodiment, document retaining member 40, which is a single sliding member, has first, second, third, and forth document retaining parts 91a, 41b, 41c, and 41d (see FIG. 7). A third embodiment is different from the second embodiment because first, second, third, and forth document retaining parts 70a, 70b, 70c, and 70d are formed separately as independent sliding members (see FIG. 12).

Configuration of Third Embodiment

A configuration of document retaining part 70 according to the third embodiment is explained as follows by referring to FIGS. 12 to 15. FIGS. 12 to 15 show a configuration of document retaining part 70 according to the third embodiment.

Figure 12:
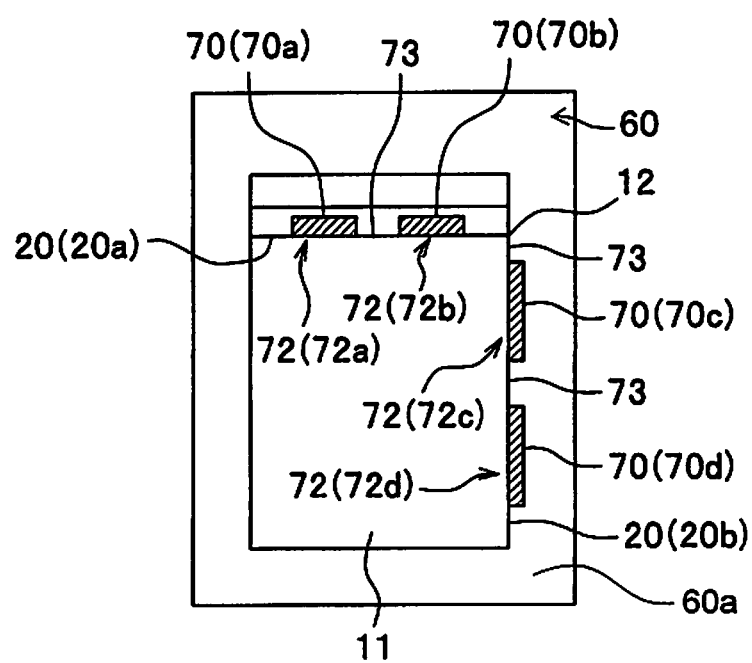
FIG. 12 is a plan view of a platen of an image scanning apparatus showing a configuration of a document retaining part according to a third embodiment.

FIG. 12 is a plan view showing document retaining part 70 and a vicinity of the same. As shown in FIG. 12, document retaining part 70 as a document retaining member is disposed on document platen 60.

Document retaining parts 70 are provided at positions corresponding to first side 20a and second side 20b that meet at reference point 12. In FIG. 12, first document retaining part 70a and second document retaining part 70b are provided at positions corresponding to first side 20a, and third document retaining part 70c and forth document retaining part 70d are provided at positions corresponding to second side 20b.

Figure 13:
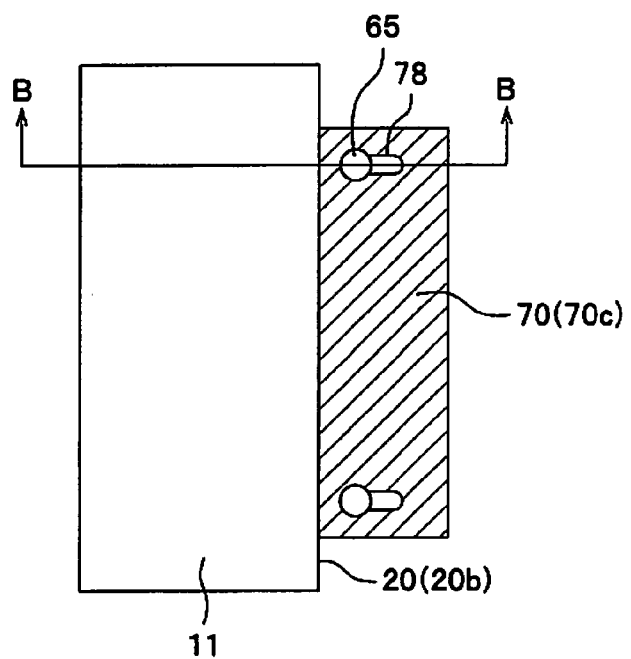
FIG. 13 shows a positional relationship between a document retaining member having the document retaining part and a glass surface according to the third embodiment.
Figure 14:
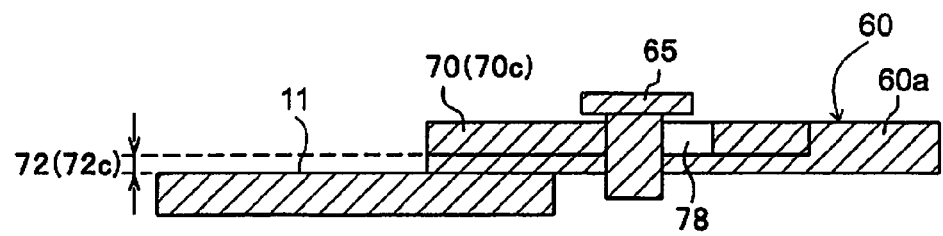
FIG. 14 is a sectional view thereof along the B-B line in FIG. 10.

Similar to document retaining member 40 in the second embodiment, document retaining part 70 is slidably attached to frame 60a of document platen 60 so that document retaining part 70 does not get in the way of placing a thick document 3 such as a book or a magazine onto glass face 11 (see FIGS. 13 and 14). FIGS. 13 and 14 show attachment configurations of document retaining part 70 to frame 60a of document platen 60. FIG. 13 is an enlarged view of third document retaining part 70c as an example of document retaining part 70. FIG. 14 is a sectional view along line B-B shown in FIG. 13.

As shown in FIGS. 13 and 14, document retaining part 70 has elongated hole 78 that extends in a direction orthogonal to side 20b. Projection 65 is fixed at frame 60a of document platen 60. Projection 65 is inserted in and engaged with elongated hole 78, so that document retaining member 70 is slidable with respect to frame 60a along elongated hole 78. There is a step (a difference in level) between the bottom face of document retaining part 70 and glass surface 11 that corresponds to the thickness of frame 60a. As document retaining part 70 is slid in the "b" direction shown in FIG. 15A and document retaining part 70 is above glass surface 11, the step forms gap 72 defined by the bottom face of document retaining part 70 and glass surface 11, where a side of document 3 can be inserted.

Figure 15A:
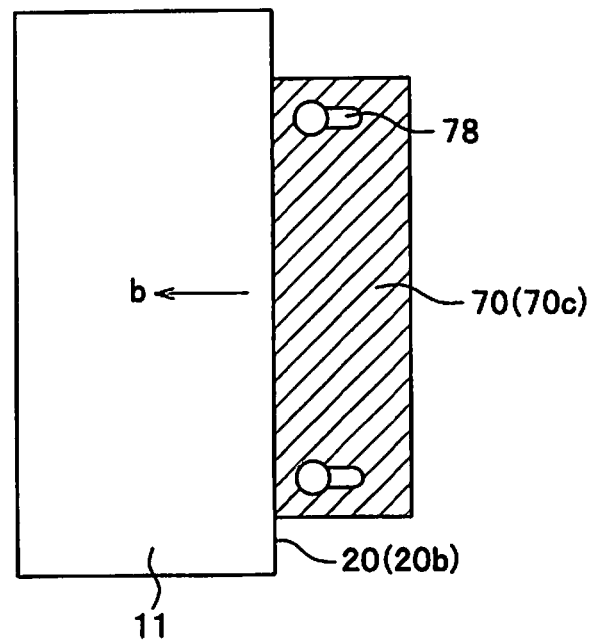
Figure 15B:
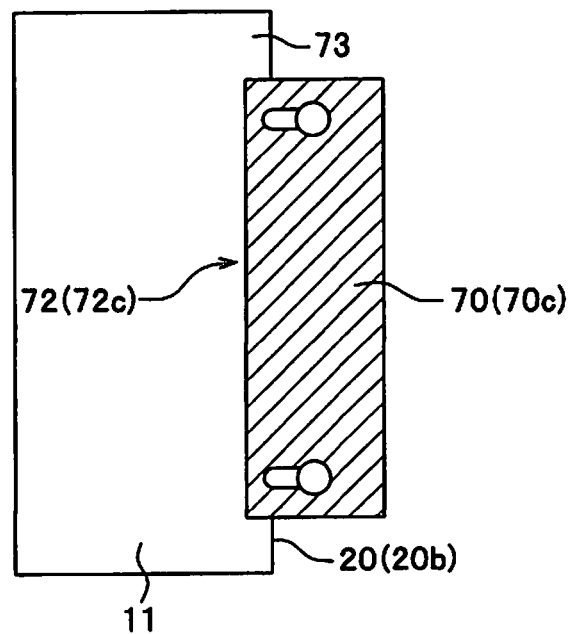

FIGS. 15A and 15B show the operation of document retaining part 70. FIG. 15A shows a state before document retaining part 70 is slid and FIG. 15B shows a state after document retaining part 70 is slid. The slidable distance of document retaining part 70 is restricted by the length of elongate hole 78.

Document retaining part 70 slides in the "b" direction on document platen 60 (that is, in a direction orthogonal to side 20) as shown in FIG. 15A. As shown in FIG. 15B, upon sliding, document retaining part 70 forms gap 72 between document retaining part 70 and glass surface 11, to which a side of document 3 can be inserted. Hereinafter, gaps 72 that correspond to each document retaining member 70 are distinguished by referring to them as "first gap 72a" for gap 72 that corresponds to first document retaining part 70a, "second gap 72b" for gap 72 that corresponds to second document retaining part 70b, "third gap 72c" for gap 72 that corresponds to third document retaining part 70c, and "forth gap 72d" for gap 72 that corresponds to forth document retaining part 70d. Further, section 73 of side 20 that does not have document retaining part 70 is referred to as "visual inspection section 73" at which an operator visually checks whether a side of document 3 is touching to side 20 of document platen 60.

When an operator of image scanning apparatus 1 places document 3 on glass surface 11 of document platen 60, the operator inserts a side of document 3 to first gap 72a and second gap 72b at first side 20a, then slides document 3 towards second side 20b to insert another side of document 3 to third gap 72c and forth gap 72d at second side 20b. While placing document 3 on document platen 60, the operator looks at the two sides of document 3 to check whether the sides of document 3 are touching sides 20a and 20b of document platen 60. In this manner, document 3 can be placed on glass surface 11 of document platen 60.

Similar to that of document retaining member 40 in the second embodiment, the operator can slide document retaining part 70 so that a position of document retaining member 40 is moved appropriately. Preferably, the position is moved depending on a kind of document 3. For example, when document 3 is a thick medium such as a book or a magazine, the position can be changed as shown in FIG. 15A, whereas when document 3 is a thin medium, the position can be changed as shown in FIG. 15B.

As described above, according to the third embodiment, the same effect as in the second embodiment is achieved.

Further, according to the third embodiment, because document retaining part 70 is formed independently as an individual member, gap 72 can be formed only where necessary to retain a side of document 3.

Further, even if the distortion of document 3 is large, platen mechanism 5b is operable by adjusting the amount of the protrusion of document retaining part 70 out of side 20. Therefore, document retaining part 70 can effectively retain document 3 even though the distortion of document 3 is large.

Note that in the first to the third embodiments, image scanning apparatus 1 is assembled as a part of image processing apparatus 100 such as a MFP; however, the invention may be applied to a stand-alone image scanning apparatus 1.

Further, in the first to third embodiments, image processing apparatus 100 is configured as a MFP; however, image processing apparatus 100 may be a copying apparatuses configured to print out scanned images, and computers or facsimile apparatuses configured to transmit scanned image information to other apparatus.

The invention is not limited to the above-mentioned embodiments, but the invention may be variously changed or modified to a degree that such change or modification does not deviate from a gist of the invention.

Figure 16:
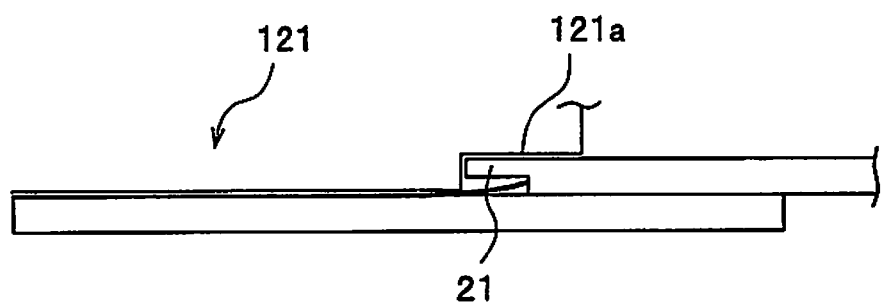
FIG. 16 shows a modification of a document presser.

For example, document presser 121 (see FIG. 2) may be changed to a configuration shown in FIG. 16. FIG. 16 is a modification of document presser 121. Document presser 121 shown in FIG. 2 is formed slightly larger than that of glass surface 11, so document presser 121 thus comes in contact with document retaining part 21. With this, when document presser 121 is pressed document 3 against glass surface 11, the difference of level between document presser 21 and glass surface 11 may cause an uneven pressure. A configuration shown in FIG. 16 is capable of reducing the uneven pressure. As shown in FIG. 16, document presser 121 has a recess at section 121a, which faces document retaining part 21 when cover 120 is closed. Section 121a is formed to withdraw document presser 121 from document retaining part 21 so that document presser 121 and document retaining part 21 do not come in contact with each other. Hereinafter, this section 121a is referred to as "recess 121a." In the example shown in FIG. 16, document presser 121 is not in contact with document retaining part 121, so document 3 thus can be evenly pressed against glass surface 11.

Figure 17:
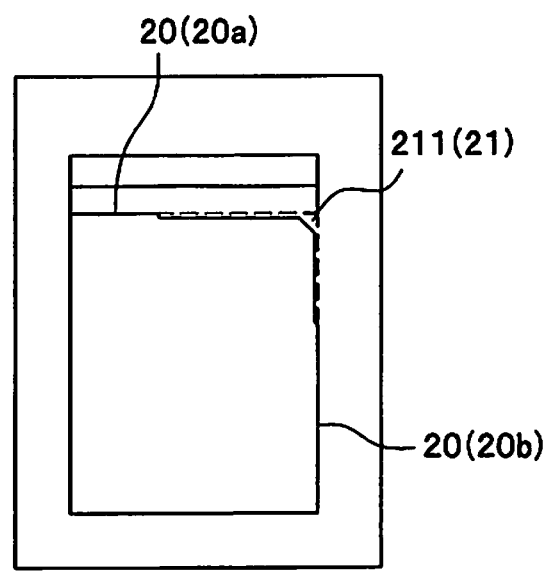
FIG. 17 shows a modification of the document retaining part according to the first embodiment.
Figure 18:
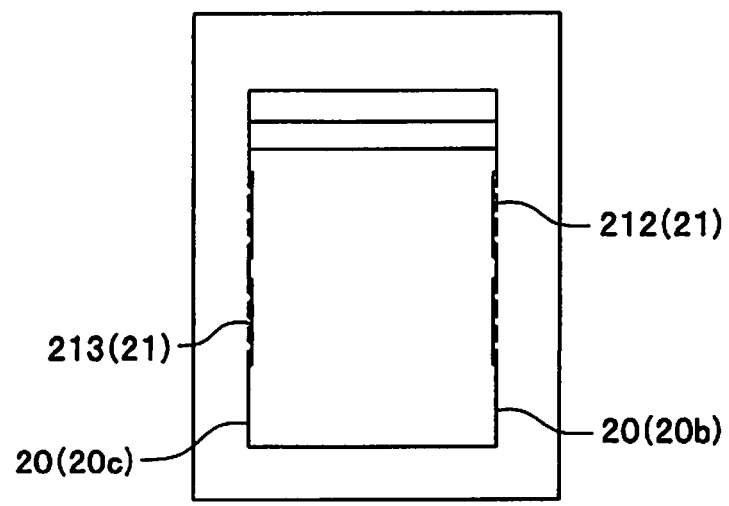
FIG. 18 shows another modification of the document retaining part according to the first embodiment.

For example, document retaining part 21 in the first embodiment may be changed to a configuration shown in FIGS. 17 and 18. FIGS. 17 and 18 are modifications of document retaining parts according to the first embodiment. In an example shown in FIG. 17, document retaining part 21 has a bridge section 211 at a meeting section of first side 20a and second side 20b such that document retaining part 21 extends along sides 20a and 20b from first side 20a to second side 20b through the meeting section where first side 20a and second side 20b meet. In an example shown in FIG. 18, document retaining part 21 is provided at each of opposite sides 20 (i.e., second side 20b and its facing side 20c in FIG. 18) as document retaining parts 212 and document retaining parts 213.

For example, in the second embodiment, document retaining member 40 is described as sliding in the "a" direction shown in FIG. 10A. However, document retaining member 40 may be configured to slide in a direction parallel to first side 20a and/or second side 20b.

For example, document retaining member 40 in the second embodiment may be formed as an L-shape member having a side along first side 20a and a side along second side 20b.

For example, in the third embodiment, document retaining part 70 is configured to slide in the "b" direction shown in FIG. 15A. However, document retaining part 70 may be configured to slide in a diagonal direction relative to side 20.

Figure 19:
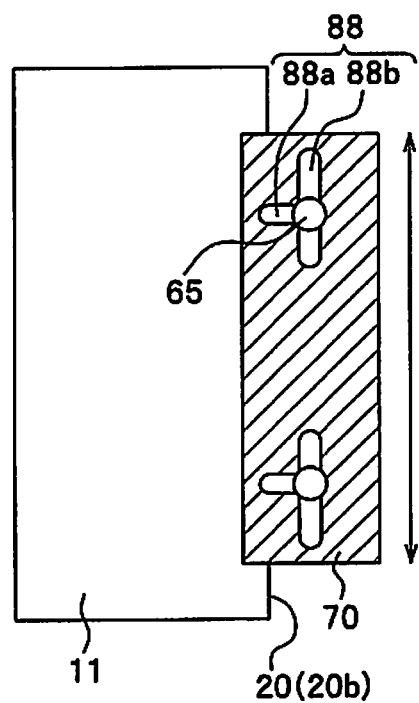
FIG. 19 shows a modification of the document retaining part according to the third embodiment.

For example, document retaining part 70 in the third embodiment may be changed to a configuration shown in FIG. 19. FIG. 19 is a modification of document retaining parts according to the third embodiment.

In an example shown in FIG. 19, elongated hole 88 of document retaining part 70 includes elongated hole 88a extended in a direction orthogonal to side 20 and elongated hole 88b extended in a direction parallel to side 20. With this configuration, document retaining part 70 can slide to the direction orthogonal to side 20 (i.e. an arrow direction shown in FIG. 19) and then slide to the direction parallel to side 20. Document retaining part 70 can adjust the amount of the slide in the arrow direction shown in FIG. 19 so that document retaining part 70 can be applied to document 3 of multiple types that come in various sizes. That is, document retaining part 70 is capable of appropriately retaining document 3 in different sizes.

Figure 20A:
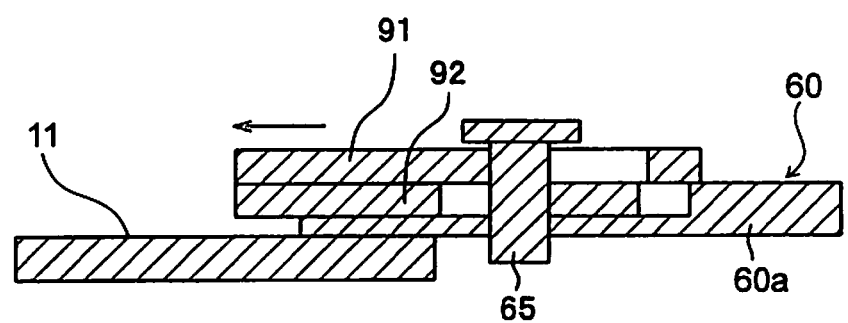
FIG. 20 shows another modification of the document retaining part according to the third embodiment.
Figure 20B:
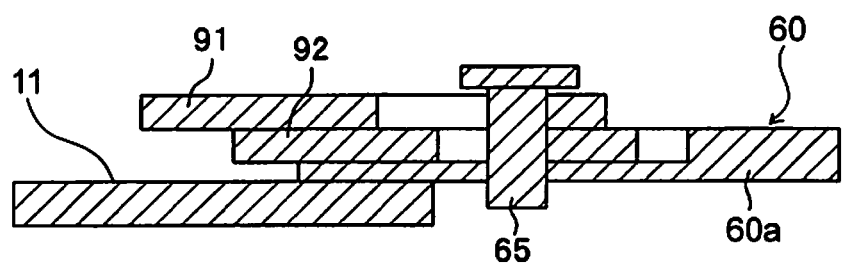

For example, document retaining part 70 in the third embodiment may be changed to a configuration shown in FIG. 20. FIG. 20 is a modification of document retaining parts respectively according to the third embodiment. In an example shown in FIG. 20, document retaining part 70 is divided into upper document retaining member 91 and lower document retaining member 92. Upper document retaining member 91 and lower document retaining member 92 are independently slidably supported by projection 65 along elongate hole. Either of upper document retaining member 91 and lower document retaining member 92 is positioned so that document retaining part 70 can be applied to document 3 of multiple types that come in various thicknesses. That is, document retaining part 70 is capable of appropriately retaining document 3 in different thickness.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image scanning apparatus comprising:
   a platen including a document placing surface having plural sides defining the document placing surface;
   a scanning unit configured to scan an image from a document placed on the document placing surface of the platen; and
   document retaining parts provided at positions corresponding to at least a first side and a second side of the document placing surface of the platen and configured to prevent the document from curling away from the platen, wherein the first side and the second side of the document placing surface are adjacent to each other and not parallel to each other.

2. The image scanning apparatus according to claim 1, wherein
   the platen comprises:
   the document placing surface where the scanning unit can scan the image; and
   a frame around the document placing surface and defining the document placing surface.

3. The image scanning apparatus according to claim 1, wherein the document placing surface is substantially transparent and the scanning unit is disposed to face the document through the transparent placing surface.

4. The image scanning apparatus according to claim 2, wherein the document retaining parts are formed integrally with the frame.

5. The image scanning apparatus according to claim 2, wherein the document retaining parts protrude from the frame to positions above the document placing surface.

6. The image scanning apparatus according to claim 1, wherein each of the document retaining parts and the document placing surface define a gap there-between.

7. The image scanning apparatus according to claim 1, further comprising:
   a cover rotatable relative to the platen about a rotation axis, wherein at least one of the document retaining parts is provided at the first side of the document placing surface that is parallel to the rotation axis.

8. The image scanning apparatus according to claim 7, wherein another of the document retaining parts is provided at the second side of the document placing surface.

9. The image scanning apparatus according to claim 1, wherein the first side and the second side of the document placing surface are orthogonal to each other.

10. The image scanning apparatus according to claim 2, wherein the document retaining parts are formed at a slide member that is slidable relative to the platen.

11. The image scanning apparatus according to claim 10, wherein one of the slide member and the frame is formed with a hole, and the other of the slide member and the frame is formed with a projection that is inserted into and engaged with the hole, such that the slide member is slidable along the hole.

12. The image scanning apparatus according to claim 11, wherein the hole is an elongated hole that extends parallel to one of the sides of the document placing surface.

13. The image scanning apparatus according to claim 11, wherein the hole is an elongated hole that extends diagonal to one of the sides of the document placing surface.

14. The image scanning apparatus according to claim 10, wherein the slide member has an opening that has a substantially same shape as the document placing surface and wherein the slide member is formed around the document placing surface.

15. The image scanning apparatus according to claim 14, wherein the document retaining parts are formed at least a first side and a second side of the opening of the sliding member and protrude inwardly towards the opening.

16. The image scanning apparatus according to claim 1, wherein a corner where the first side and the second side meet each other has a visual inspection section where no document retaining part is formed.

17. The image scanning apparatus according to claim 1, wherein one of the document retaining parts is a slide member, the side member including a first slide plate slidably attached to the platen and a second slide plate slidably attached to the first slide plate.

18. An image processing apparatus comprising:
- an image scanning apparatus configured to scan an image of a document; and
- an image forming apparatus configured to form the scanned image onto a medium;
- the image scanning apparatus including:
  - a platen including a document placing surface on which a document can be placed, the document placing surface having plural sides defining the document placing surface;
  - a scanning unit configured to scan an image from the document placed on the document placing surface of the platen; and
  - document retaining parts provided at positions corresponding to at least a first side and a second side of the document placing surface of the platen and configured to prevent the document from curling away from the platen, wherein the first side and the second side of the document placing surface are adjacent to each other and not parallel to each other.

19. An image scanning apparatus comprising:
- a platen including a document placing surface on which a document can be placed, the document placing surface having plural sides defining the document placing surface;
- a scanning unit configured to scan a document placed on the document placing surface of the platen; and
- document retaining parts configured to prevent the document from curling away from the platen, the document retaining parts including a first document retaining part that captures a first side of the document, and a second document retaining part that captures a second side of the document which is adjacent to and is not parallel to the first side of the document.

* * * * *